United States Patent
Duong et al.

(10) Patent No.: US 8,560,016 B2
(45) Date of Patent: Oct. 15, 2013

(54) METHOD AND APPARATUS TO PREVENT RECEIVER DESENSITIZATION FROM RADIATED HDMI SIGNALS IN ACCESSOR OR COMPUTING DEVICES

(75) Inventors: Minh H. Duong, Lake Bluff, IL (US); Md Faisal Abedin, Lindenhurst, IL (US); Sethu Hareesh Kolluru, Palatine, IL (US)

(73) Assignee: Motorola Mobility LLC, Libertyville, IL (US)

( * ) Notice: Subject to any disclaimer, the term of this patent is extended or adjusted under 35 U.S.C. 154(b) by 29 days.

(21) Appl. No.: 13/343,094

(22) Filed: Jan. 4, 2012

(65) Prior Publication Data

US 2013/0172049 A1 Jul. 4, 2013

(51) Int. Cl.
*H04M 1/00* (2006.01)
(52) U.S. Cl.
USPC .............. 455/559; 455/41.2; 455/77; 455/88; 455/403
(58) Field of Classification Search
USPC ......................................... 455/559
See application file for complete search history.

(56) References Cited

U.S. PATENT DOCUMENTS

| | | |
|---|---|---|
| 5,263,055 A | 11/1993 | Cahill |
| 2007/0123207 A1 | 5/2007 | Terlizzi |
| 2009/0191914 A1 | 7/2009 | Stahl |
| 2009/0197591 A1 | 8/2009 | Rolf et al. |
| 2010/0041347 A1 | 2/2010 | Prise |
| 2010/0118193 A1* | 5/2010 | Boyden et al. ............... 348/554 |
| 2011/0149164 A1 | 6/2011 | Goldberg et al. |
| 2011/0167262 A1 | 7/2011 | Ross et al. |
| 2012/0225622 A1* | 9/2012 | Kudrna et al. ............... 455/41.2 |

OTHER PUBLICATIONS

Patent Cooperation Treaty, International Search Report and Written Opinion of the International Searching Authority for International Application No. PCT/US2012/071606, May 31, 2013, 9 pages.

* cited by examiner

*Primary Examiner* — Ajibola Akinyemi

(57) ABSTRACT

A method and system configures operating parameters associated with an operation of a connected accessory or second device in order to mitigate harmonic interference within an operating frequency band of a wireless communication device (WCD). In response to a connection between the WCD and the second device via a physical communications interface, Accessory Authentication and Configuration (AAC) logic of the WCD receives device identifying information about the second device. The AAC logic determines candidate values for each operating parameter, based on the device identifying information. The AAC logic dynamically selects a particular candidate value for each operating parameter, based on a current operating frequency band of the WCD, and an expected level of harmonic interference. The AAC logic automatically configures each operating parameter with the corresponding selected candidate value to enable proper operation of the second device while mitigating harmonic interference within the operating frequency band of the WCD.

20 Claims, 7 Drawing Sheets

401 Operating Freq. band : B1
accessory device type: lapdocks
models: all approved lapdock models

| Operating Parameter | Pre-established candidate values | Default value | Correlated with | Interference reduction (relative) |
|---|---|---|---|---|
| parameter A | set Aval = [A1... Ax ...An] | Ax | ----- | Vector [Ea], corresponding to set A |
| parameter B | set Bval = [B1... By ...Bm] | By | ----- | Vector [Eb] |
| ....... | ....... | ....... | ....... | ....... |
| HDMI Drive signal strength | [1 2 3 4 5] | 5 | ----- | [8 6 4 2 0] |
| HDMI Drive signal propagation frequency | [100 101 102 103 104 105 106 107 108 109 110] | 106 | Pixel clock freq. | [2 -3 -2 1 0 2 -1 0 1 3 1], if default assumed for pixel clock freq., ... |
| Pixel clock frequency | [400 404 408 412 416 420 424 428 432 436 440] | 420 | Drive signal propagation frequency | [2 -1 -2 0 0 1 -1 0 1 2 1], if default assumed for signal prop. freq., ... |
| ....... | ....... | ....... | ....... | ....... |

402
404
406
408
410

METHOD AND APPARATUS TO PREVENT RECEIVER DESENSITIZATION FROM RADIATED HDMI SIGNALS IN ACCESSOR OR COMPUTING DEVICES

BACKGROUND

1. Technical Field

The present invention relates in general to wireless communication devices and in particular to operation of a wireless communication device while connected to an accessory device.

2. Description of the Related Art

A high definition multimedia interface (HDMI) connector and/or cable is used between a wireless communication device, such as a smart-phone, and an accessory docking station to deliver high quality video and audio experiences to the accessory docking station display and stereo speakers. Because of the proximity of the wireless communication device to the HDMI connectors/cable and HDMI signal detection and conversion circuitry within the docking station, HDMI related noise radiates from the connector/cable into the wireless communication device causing desensitization of the receiver of the wireless communication device.

To minimize interference, a portable wireless communication device, such as a smart-phone, can be kept further away from a printed circuit board (PCB) within the accessory docking station by using bulky, multilayer and rigid shielded connector and cable, as well as shielded cans. However, these conventional approaches are expensive to implement, and require a larger, thicker and inflexible product design. Furthermore, these approaches lead to limited improvement in terms of the ability to reduce radiated noise. Unfortunately, the conventional approaches generally transform the accessory design into an aesthetically unpleasant product.

BRIEF DESCRIPTION OF THE DRAWINGS

The described embodiments are to be read in conjunction with the accompanying drawings, wherein:

FIG. 4 is a table that provides example operating parameters and the corresponding candidate values associated with an approved accessory docking station, based on a particular operating frequency band of a connected wireless communication device, according to one embodiment;

DETAILED DESCRIPTION

Figure 1:
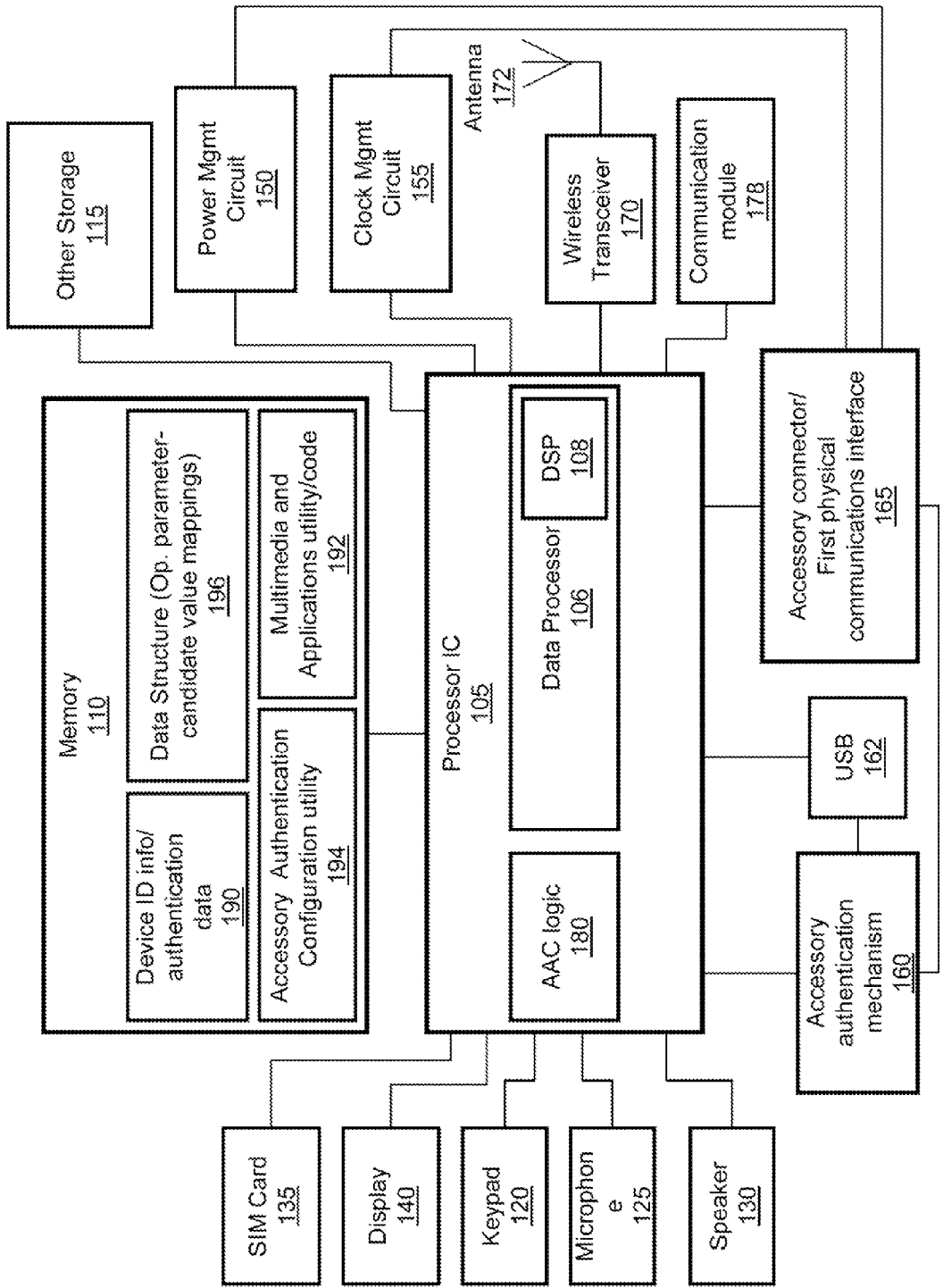
FIG. 1 illustrates a block diagram of a component-level architecture of an example wireless communication device, within which certain of the functional aspects of the described embodiments can advantageously be implemented, according to one embodiment.

The illustrative embodiments provide a method and system for configuring operating parameters associated with an operation of a connected accessory or second device in order to mitigate harmonic interference within an operating frequency band of a wireless communication device (WCD). In response to a connection between the WCD and the second device via a physical communications interface, Accessory Authentication and Configuration (AAC) logic of the WCD receives device identifying information about the second device. The AAC logic determines whether the connected second device can be authenticated as being an approved device for communicatively connecting with the WCD, based on the device identifying information. Following successful authentication, the AAC logic identifies candidate values for each configurable operating parameter. The AAC logic dynamically selects a particular candidate value for each operating parameter and automatically configures each operating parameter with the corresponding selected candidate value to enable proper operation of the second device while mitigating harmonic interference within the operating frequency band of the WCD.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names (such as those of the executing utility/logic/firmware described herein) are for example only and not meant to imply any limitations on the described embodiments. The embodiments may thus be described with different nomenclature/terminology utilized to describe the components, devices, and/or parameters herein, without limitation. References to any specific protocol or proprietary name in describing one or more elements, features or concepts of the embodiments are provided solely as examples of one implementation, and such references do not limit the extension of the claimed embodiments to embodiments in which different element, feature or concept names are utilized. Thus, each term utilized herein is to be given its broadest interpretation given the context in which that terms is utilized.

As further described below, implementation of the functional features of the invention described herein is provided within processing devices/structures and can involve use of a combination of hardware, firmware, as well as several software-level constructs (e.g., program code) that execute to provide a specific utility for the device. The presented figures illustrate both hardware components and software/logic components within example wireless communication device architecture.

With specific reference now to FIG. 1, there is depicted a block diagram of a component-level architecture of an example wireless communication device 100, within which certain of the functional aspects of the described embodiments can advantageously be implemented. For simplicity, wireless communication device 100 shall be referred to herein simply by the acronym WCD 100. While the embodiments presented herein are specifically described with reference to a wireless communication device, it is appreciated that the functionality and/or features of the described embodiments are fully applicable to different types of wireless communication devices that are capable of being electrically and/or communicatively coupled to a docking station or other second accessory device via a physical connector, such as a mini/micro universal serial bus (USB) and/or a high definition multimedia interface (HDMI) connector. WCD 100 can, for example, be a mobile device, a mobile station, a cell phone, a smart-phone, a laptop, or mobile computer.

WCD 100 comprises a plurality of functional components, including processor integrated circuit (IC) 105 comprising data processor 106 and integrated digital signal processor 108. Processor IC 105 can be generally and interchangeably referred to as "processor" to represent all of the processing components and functional logic provided on the processor IC 105. Coupled to processor IC 105 are memory 110, other persistent storage 115, and one or more input/output (I/O) components, of which keypad 120, microphone 125, audio speaker 130, and display device 140 are illustrated. In one embodiment, display device 140 can be a touch screen display, and depending on the level of user interface functionality supported by the touch screen display, WCD 100 can optionally not be provided a keypad 120.

The various I/O components allow for user interfacing with WCD 100. In addition to these above components, WCD 100 can also include other components utilized to enable standard voice, data, and/or multimedia communication from/to WCD 100. Among these components is wireless transceiver 170, which is connected to antenna 172 to enable communication of radio frequency (RF) and/or wireless signals from and to WCD 100. In one embodiment, wireless transceiver 170 is dynamically configured to operate in a certain operating frequency band and/or channel, based on at least one of: (a) a type of wireless communications network and communications protocol (e.g., a GSM-based network or a CDMA-based network) to which WCD 100 currently subscribes; (b) geographic location; and (c) other conditions that can influence a switch and/or a selection of a particular operating frequency. Certain forms of the received RF/wireless signals can be converted into audio, which can be outputted via speaker 130 during a voice communication being facilitated and/or performed via WCD 100. Also illustrated is a general communication module(s) 178 representing one or more types of secondary transceivers and/or communication portals. In one embodiment, communication module(s) 178 represents communication components, such as an infrared (IR) transceiver and a Bluetooth transceiver, for communicating data and/or other content to and from WCD 100.

Depending on the type of network for which the WCD 100 is designed, WCD 100 can comprise a Subscriber Identity Module (SIM) card 135 that stores unique features corresponding to the particular subscriber in possession of the SIM card 135. For example, WCD 100 can be a global system for mobile communication (GSM) phone and thus includes SIM card 135, which connects to processor IC 105 via a SIM card adapter/port (not shown). SIM card 135 may be utilized as a storage device for storing user data or general content, similar to other storage 115 and/or memory 110.

To enable WCD 100 to connect to and interface with various types of accessory second devices, WCD 100 comprises first physical communications interface 165, which can be an accessory connector, and mini/micro USB interface 162. First physical communications interface 165 and/or USB interface 162 can be coupled to an accessory authentication mechanism 160. In one or more embodiments, accessory authentication mechanism 160 can be integrated within or be provided by programmable logic on processor IC 105, such as Accessory Authentication and Configuration (AAC) logic 180. In this embodiment, first physical communications interface 165 is coupled to the processor IC 105 and enables connection of the WCD 100 to a device interface mechanism of an accessory second device. Likewise, USB interface 162 can be coupled to processor and provide the connection point for an accessory second device. At least one of the described embodiments allow for utilization of both first physical communications interface 165 as a primary physical communications interface to a second device and USB interface 162 as a secondary interface that handles the authentication of the accessory second device prior to enabling the second device to be utilized with WCD 100.

Processor IC 105 and the other components of WCD 100 that require electrical power can be coupled to and receive power from power management circuit 150. Power management circuit controls the distribution of electrical power to the various components of WCD 100 via a power distribution mechanism on the phone's motherboard (not shown), on which the components are built/embedded. Power management circuit 150 couples to a power source (not explicitly shown). Power management circuit 150 also provides electrical power to the various other on-board ICs and/or components (not shown). In addition, power management circuit 150 can provide electrical power required for drive signals that provide data content to an accessory device (e.g., second device 200 in FIG. 2) that is communicatively connected to WCD 100 via first physical communications interface 165. In one or more of the described embodiments, first physical communications interface 165 is a high definition multimedia interface (HDMI).

Clock management circuit 155 controls the distribution of timing signals to the various components of WCD 100 on the phone's motherboard. In addition, in one embodiment, WCD 100 propagates timing signals over the physical communications interface to the connected second device to provide timing resources to enable a proper operation of the second device. In one embodiment, WCD 100 comprises at least two internal clocks (within clock management circuit/component 155). These internal clocks represent the source clocks from which a number of output clocks can be efficiently generated. In a particular example, WCD 100 comprises three (3) sources clocks, (a) a first source clock at 200 MHz, (b) a second source clock of 320 MHz, and (c) a third source clock of 408 MHz.

As illustrated, processor IC 105 can include a programmable microprocessor (of which data processor 106 is provided as an example), as well as a digital signal processor (DSP) 108 that controls the communication and other signal processing functions and/or operations of WCD 100. Additionally, data processor 106 can include AAC logic 180, which supports the authentication and configuration processes for authenticating and configuring a connected second device. These authentication and configuration features are described in greater detail below. In one embodiment, AAC logic 180 comprises programmable code that automatically executes on data processor 106 when connection to the second device via first physical communications interface 165 and/or via mini/micro USB interface 162 is detected.

In addition to the above hardware components, several functions of WCD 100 and specific features of the invention may be provided as functional code and/or data that is stored within memory 110 and/or other storage 115 and executed on or utilized by data processor 106. In particular, memory 110 comprises device identifying information 190, which can be received from second device 200 of FIG. 2, and "connected second device harmonic noise mitigating" data structure 196, referred to hereinafter simply as data structure 196. Data structure 196 comprises mappings and/or shows correlations between operating parameters and assumable candidate values. These mapping and/or correlations are associated with at least one operating frequency of WCD 100. Within data structure 196 each mapping associated with a particular operating frequency can be a separate table, such as the example table 400 presented by FIG. 4, which is described below. Also stored within memory 110 are and one or more multimedia and applications utilities 192, which when executed by data processor 106 enables various functional features and generates the user interface mechanisms of WCD 100. Data processor 106 executes the various functional code and firmware, such as accessory authentication and configuration utility (AACU) 194, to provide processor-level control for the authentication and configuration of a second device to which WCD 100 is physically coupled.

According to one implementation, when AACU 194 is executed by data processor 106, AACU 194 generates AAC logic 180, which performs and/or provides the following functions, among others: (a) receives device identifying information about a connected, second device; (b) initiates an authentication procedure to determine whether the connected second device can be authenticated as being an approved device for communicatively connecting with the WCD, based on the device identifying information; (c) in response to successful authentication of the second device, determines, for each of at least one configurable operating parameter associated with an operation of the connected second device, a set of candidate values that are mapped to a corresponding configurable operating parameter; (d) dynamically selects a candidate value, from among the set of candidate values, for configuring the corresponding configurable operating parameter, based on at least one of (i) a current operating frequency band of the wireless communication device; (ii) a current operating frequency channel of the wireless communication device; or (iii) a level of harmonic interference expected within the current operating frequency band of the wireless communication device due to operation of the second device; and (e) automatically configures each of the at least one configurable operating parameter with a corresponding selected candidate value. The process of automatic configuring the configurable operating parameter(s) with the corresponding selected candidate value(s) results in a mitigation of at least one of a radiated noise level and a harmonic interference within the current operating frequency band of the wireless communication device. As utilized herein, the term "dynamically" and specifically "dynamically selects" refers to the device performing the selecting of the candidate value independently without requiring any external control to complete the selection. The selection is initiated by the device without a user or other device triggering or requesting the selection. The term "automatically" and specifically "automatically configures" refers to the device immediately performing the configuration in response to some trigger condition.

The above listed functions represent a subset of the functional processes of the described embodiments, which processes are expanded upon below and illustrated in part by the flow charts of FIGS. 5, 6 and 7, as well as the other figures. In one alternate embodiment, the functions are performed in part by the accessory authentication mechanism 160 and specifically authentication and configuration logic. The authentication and configuration logic initiates the authentication and configuration processes via corresponding interfaces responsive to detection of an electrical coupling of the first physical communications interface 165 and/or USB interface 162 with an appropriate device interface mechanism of the connected second device.

Figure 2:
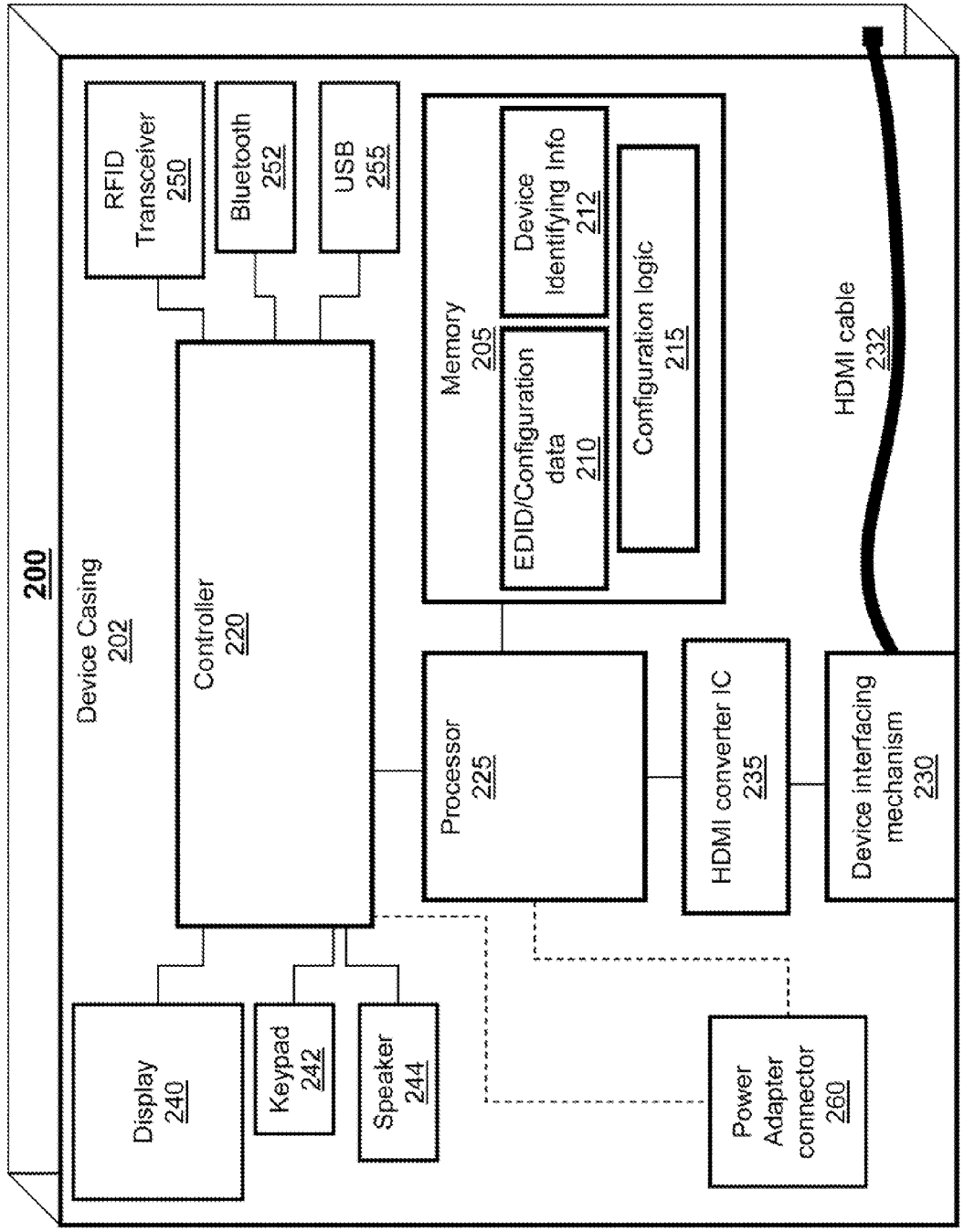
FIG. 2 is a block diagram representation of an example second device, which is designed and manufactured as an accessory docking station to a wireless communication device, according to one embodiment.

Referring now to FIG. 2, there is illustrated a block diagram representation of an example accessory second device 200. In one embodiment, second device 200 is designed and manufactured as a docking station to WCD 100. According to one embodiment, a docking station is an accessory electronic device to which a smart-phone or other WCD can connect to provide the smart-phone and/or WCD with an expanded and/or enhanced functionality. For example, the docking station can allow the WCD or smart-phone access to one or more of a larger digital display, a full-size keyboard, a more powerful set of speakers and/or a charging base provided by connecting to and utilizing the particular type of docking station. When a WCD or smart-phone is combined with a docking station serving as a second device 200, the processor of the WCD/smart-phone provides the processing capability of the combination to connect with services and applications. The processor, described below, of the second device 200 is intended to control the components of the second device. Second device 200 is generally configured for receiving an electronic device, such as WCD 100. Second device 200 comprises an external casing 202, which securely fastens device interfacing mechanism 230 in place and enables device interfacing mechanism 230 to extend beyond a surface of the casing 202. It is to be also understood that external casing 202 may be used as a conduit for an internal HDMI cable 232 that is used to connect device interfacing mechanism 230 to HDMI converter IC 235. The internal HDMI cable 232 can be a short cable having a length that satisfies design and/or connection specifications. In one embodiment, HDMI cable 232 can be positioned within external casing 202 to minimize harmonic interference to WCD 100, while enabling second device 200 to satisfy performance requirements.

Second device 200 comprises processor 225 which is coupled to controller 220 and to memory 205. Included within Memory 205 are device identifying information 212 and extended display identification data (EDID)/configuration data 210. Memory 205 further includes configuration logic 215. In addition, second device 200 comprises HDMI converter integrated circuit (IC) 235 disposed within casing 202 and electrically and communicatively coupled to the device interfacing mechanism 230, which for purposes of this embodiment is an HDMI connecting port to which HDMI (230) can be coupled. Second device 200 can also comprise one or more ports for coupling or wirelessly connecting second device 200 to other devices. For example, second device 200 is illustrated having RFID transceiver 250, Bluetooth® 252, and one or more universal serial bus (USB) ports 255.

Responsive to detection of an electrical coupling of a communications port of an electronic device (e.g., first physical communications interface 165 of WCD 100) to device interfacing mechanism 230 of second device 200, or detection of a connection of USB port 255 to a USB interface of an electronic device (e.g., USB interface 162), second device 200 automatically transmits device identifying information 212 to connected electronic device, e.g., WCD 100.

Second device 200 also comprises several input/output (I/O) components, including display device 240, keypad 242 and speaker 244, which are individually coupled to controller 220. As further illustrated, second device 200 comprises a power adapter connector 260 at which electrical power can be supplied to the second device 200 from an external power source. The embodiments described herein assume that second device 200 is a particular type of second device having specific operational capabilities, which operational capabilities can be enabled by selectively configuring at least one configurable operating parameter associated with the operation of the second device.

Figure 3:
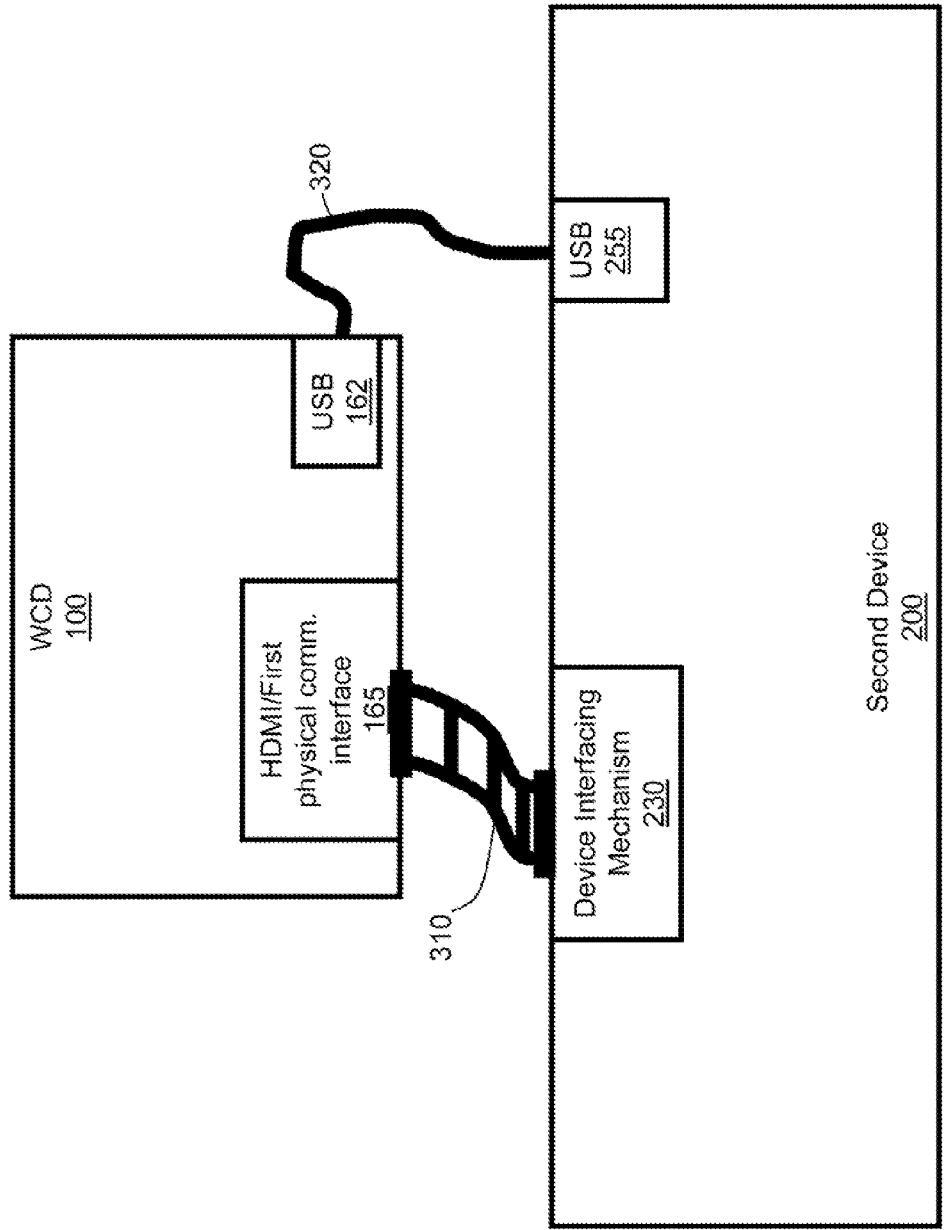
FIG. 3 illustrates a physical coupling and/or connection of the device interface mechanism of a second device with an accessory communication port of a wireless communication device, according to one embodiment.

In one implementation, the physical connection between WCD 100 and second device 200 can be a direct connection. However, as with conventional HDMI device pairings, the connection can also include a short cable, and specifically a HDMI cable, with connecting ends inserted into respective HDMI of WCD 100 and of second device 200. FIG. 3 illustrates a physical coupling and/or connection of the device interface mechanism 230 of second device 200 with first physical communications interface 165 of WCD 100 via a length of cabling, which shall be referred to generally as connecting cable 310. It is appreciated that connecting cable 310 can be an HDMI cable when the interfaces of both devices that are being connected are HDMIs. As introduced above, the design specifications of the HDMI cable 232 can help to minimize harmonic interference when WCD 100 is connected to second device 200, while enabling second device 200 to satisfy high performance requirements. FIG. 3 also illustrates a secondary connection between USB interface 162 of WCD 100 and USB port 255 of second device 200 via a USB cable 320. USB cable 320 is a serial cable that enables a connection between USB interfaces within a distance equal to the length of the cable.

Those of ordinary skill in the art will appreciate that the hardware depicted in FIGS. 1-3 may vary depending on implementation. Other internal hardware or peripheral devices may be used in addition to or in place of the hardware depicted in FIGS. 1-3. Also, the processes of the present invention may be applied to any portable/handheld electronic device or data processing system or similar device with a connecting port for connecting the device to an accessory that is one of many different types (or classes) of accessories, with specific capabilities that can be supported by the device. Thus, the depicted examples are not meant to imply architectural limitations with respect to the presented embodiments.

According to one aspect of the disclosure, WCD 100 receives device identifying information about second device 200 that is connected to WCD 100, when second device connects to WCD 100 via first physical communication interface 165. In one embodiment, the second device identifying information is received via the USB interface 162 in response to physical coupling of the two devices via the USB interface. Transmission of the device identifying information can be automatically triggered at second device 200 in response to second device 200 detecting that a USB connection between both devices is being established. In an alternate embodiment, second device 200 sends the device identifying information to WCD 100, in response to detecting that a connection is being established between WCD 100 and second device 200 via the first physical communication interface. With this alternate embodiment, no separate USB connection is required to trigger the transfer of device identifying information and/or to initiate second device authentication and/or configuration, as described below. In one implementation, the device identifying information provides at least one of: (a) identification of a connected, second device type and a specific model of the second device; and (b) identification of operational capabilities of second device 200.

In one embodiment, in response to receipt of the device identifying information, WCD 100 initiates an authentication procedure to determine whether second device 200 is an approved device for connecting to WCD 100 via the first physical communication interface. However, aspects of the disclosure can also be implemented with alternate embodiments in which no authentication is required for connecting and configuring the two devices to communicate with each other. With these alternate embodiments, WCD 100 does not execute an authentication procedure. Rather, in response to detecting a connection with second device 200, WCD 100 initiates a process to configure operating parameters for one or both of WCD 100 and second device 200, which operating parameters are associated with operation of the connected second device. In the embodiments in which WCD 100 is configured to first perform the authentication procedure, the second device identifying information is utilized as authentication data in the authentication procedure, and WCD 100 determines, based on an analysis of the authentication data, whether the second device is an approved accessory second device for communicating with over the first physical communication interface.

In one or more embodiments, configuration logic 215 enables authentication of second device 200 with the connected WCD 100 via a communication protocol, such as the whisper protocol. As utilized herein, the whisper protocol is a device authentication and configuration protocol that ensures that second device 200 is capable of being utilized with WCD 100. Accordingly, in the described embodiments, each second device that supports the whisper protocol can, following detection of a connection with WCD 100, autonomously forward device identifying information 212 that provides authentication data to WCD 100 to identify what broad category or class the second device falls into. When WCD 100 is initially coupled to the second device 200, the accessory authentication mechanism 160 of WCD 100 identifies the type of the connected second device based on device identifying information 212 received from second device 200.

As introduced above, in one embodiment, WCD 100 can receive the authentication data via a wired communication over a second physical communication interface, for example, a USB interface 162. When authentication is performed via the second physical communications interface, or USB, authentication can be triggered by one of: (a) second device 200 detecting a connection between corresponding second physical communications interfaces (e.g., a connection between USB interface 162 of WCD 100 and USB 255 of second device 200); (b) second device 200 detecting a connection between corresponding first physical communications interfaces (e.g., HDMI) of both devices; and (c) second device 200 detecting both connections between corresponding first physical communications interfaces and corresponding second physical communications interfaces of both devices.

In an alternate embodiment, WCD 100 can receive the authentication data via a wireless communication. When authentication is performed via a wireless communications interface, authentication can be triggered by one of: (a) second device 200 detecting a wireless connection (e.g., handshaking) between WCD 100 and second device 200; (b) second device 200 detecting a connection between corresponding first physical communications interfaces of both devices; and (c) second device 200 detecting both the wireless handshake and the connection between corresponding first physical communications interfaces.

In performing the authentication procedure, AAC logic 180 determines, by comparing the authentication data with at least one authentication parameter stored within WCD 100, whether second device 200 is an approved device for connecting to the communication device via first physical communication interface 165. In response to determining that second device 200 is an approved device, WCD 100 initiates a configuration procedure to enable proper operation and utilization of second, connected device 200. However, in response to determining that second device 200 is not an approved device, AAC logic 180 prevents second device 200 from communicating with WCD 100 via first physical communication interface (165).

In one embodiment, AAC logic 180 is able to initiate the authentication procedure by using information received by WCD 100 from second device 200 over the second physical communication interface (e.g., USB 162). WCD 100 utilizes the second physical communication interface to perform the authentication because of established authentication protocols associated with the utilization of a mini/micro USB interface of a plurality of approved accessories. In one embodiment, the connection established via USB 162 can be utilized to provide electrical power to charge WCD 100. The connection via USB 162 can also be utilized to provide audio output when the display of the second device 200 is not available, e.g., when the display is closed. It is appreciated that when the display is closed or not operational, there is no HDMI signal being sent from WCD 100 to the display of second device 200. By using USB 162 for audio, a user can still access audio functionality to listen to music and/or to utilize a hands-free speakerphone through the more powerful set speakers of second device 200, while the display is closed or not operational. Thus, authentication of the second device 200 can, in one or more embodiments, be required solely to utilize the HDMI functionality of the device. However, in alternate embodiments, failure of the authentication procedure can cause the second device 200 to be incapable of being utilized for any of the secondary functions that would otherwise be available via the USB connection.

In one embodiment, WCD 100 initiates the configuration procedure by requesting configuration data from second device 200. In another embodiment, the configuration data is provided in response to the connection of WCD 100 to second device 200 via the first physical communication interface, and the configuration data can be provided to WCD 100 concurrently with the device identifying information.

In one embodiment, second device 200 is an accessory, which may be a docking station, having an HDMI receptor or HDMI cable 232 to which the HDMI (165) of WCD 100 is connected. In one embodiment, WCD 100 can communicate with the accessory via the HDMI only after a successful authentication of the accessory as an approved second device for communicating via the HDMI. Following successful authentication, WCD 100 receives from second device 200 configuration data in the form of extended display information data (EDID) that comprises a plurality of specifications for a display component of the second device. In one embodiment, the EDID specifications include at least one of: (a) a set of recommended values for associated configurable operating parameters; and (b) a set of default values for the associated configurable operating parameters.

Extended display identification data (EDID) is a data structure provided by a digital display (e.g., display 240 of second device 200) to describe the capabilities of the display to a data content source. For example, the data content source can include a graphics card, a set-top box, or according to the described embodiments, WCD 100. When received from a connected second device, the EDID notifies WCD 100 about the kind of monitors that is connected to WCD 100. EDID is defined by a standard published by the Video Electronics Standards Association (VESA). The EDID can include manufacturer name and serial number, product type, phosphor or filter type, timings supported by the display, display size, luminance data and (for digital displays only) pixel mapping data.

According to the described embodiments, proper operation and utilization of second device 200 while the device is connected to WCD 100 are enabled by configuring a set of configurable operating parameters with values selected from a plurality of candidate values. During configuration, AAC logic 180 determines, for each configurable operating parameter associated with an operation of the connected second device, a set of candidate values that are mapped to a corresponding configurable operating parameter. In one embodiment, these mappings are based on a specific operating frequency being utilized during wireless communications by transceiver 170 of WCD 100.

In one embodiment, WCD 100 retrieves pre-determined, candidate values that are associated with a configurable operating parameter, for each one of the set of configurable operating parameters, from stored data structure 196 within WCD 100. In one embodiment, the pre-established, candidate values include at least one default, preferred and/or standard value.

In one embodiment, the set of configurable operating parameters include a first configurable operating parameter for a drive signal level for signals communicated over the HDMI to second device 200. Second device 200 can include a video output component that operates utilizing at least one of a second configurable operating parameter for HDMI signal propagation frequency and a third configurable operating parameter for pixel clock frequency. In this one embodiment, each of the first, second and third configurable operating parameters can assume a value selected from multiple, selectable pre-established candidate values. In particular, the collective set of candidate values for the set of configurable operating parameter can include: a first set of candidate values for the drive signal level; a second set of candidate values for an HDMI signal propagation frequency; and a third set of candidate values for a pixel clock frequency of a video component (e.g., display 240) of second device 200.

In response to determining and/or identifying a set of candidate values, data processor 106 dynamically selects a candidate value, from among the set of candidate values, for configuring the corresponding configurable operating parameter. The processor selection is based on at least one of (a) a current operating frequency band of WCD 100; (b) a current operating channel of WCD 100; (c) a level of harmonic interference expected within the current operating frequency band of WCD 100. The level of harmonic interference expected is pre-determined, based on the results of performance measurements and/or testing using the various candidate values.

When the first operating parameter is the HDMI drive signal level, AAC logic 180 selects a lower value for the drive signal level from the corresponding, first set of candidate values for the drive signal level. Selection of a lower value for drive signal level reduces the level of harmonic interference in the operating frequency band of WCD 100 than would be experience at the default higher drive signal level. The lower value selected can be determined by considering the lower end of the range of signal strength that still enables high performance operation of the second device. The requirements for proper and/or high performance device operation are therefore balanced against the requirements for harmonic interference reduction in selecting the applied drive signal level for the HDMI. In one embodiment, a pre-established default drive signal value is provided and can be a maximum value or some other higher value than the selected lower value utilized for the drive signal level. Thus, AAC logic 180 selects the lower value, which can be a minimum value, instead of the pre-established default value, to provide a reduced overall noise level within the current operating frequency band of WCD 100.

Data structure 196 of WCD 100 can comprise a plurality of tables or mappings, based on different operating frequencies with which the device's transceiver 170 can operate. FIG. 4 illustrates an example series of mappings within an example table 400 of data structure 196. Table 400 provides example operating parameters and the corresponding candidate values associated with an approved second device based on operation of a connected wireless communication device within a particular operating frequency band, according to one embodiment. In the illustrative embodiment, table 400 represents a subset of data structure 196 (FIG. 1) for connection by WCD 100 to a lapdock-type accessory docking station, as the second device. More particularly, table 400 provides pre-established candidate values and associations based on a first operating frequency band, B1. It is appreciated that other tables can be maintained within data structure 196 representing mappings of pre-established candidate values with operating parameters for (a) a plurality of different operating frequency bands that can be configured by WCD 100 within a corresponding communications network and (b) a plurality of different types of second devices.

Table 400 provides, for each candidate value (shown in the second column of Table 400) associated with a configurable operating parameter (shown in the first column of Table 400), a corresponding level of harmonic interference expected (shown in the fifth column of Table 400) within the current operating frequency band "B1" (from table specifications 401) of WCD 100. This level of harmonic interference occurs when WCD 100 is set to communicate with transceiver 170 utilizing operating frequency band, B1, while WCD 100 is connected to second device 200 and the two devices are actively communicating HDMI signals over the first physical interface. The specific level of harmonic interference then corresponds to the second device operating with a configurable operating parameter configured with the corresponding candidate value indicated within the table 400. Table 400 indicates that one or more of the multiple selectable pre-established candidate values are associated in the stored data structure 196 with parameters from table specifications 401 that include at least one of (a) a specific device type identifier (e.g., for a docking station, such as a "lapdock" or "web-top" docking station) corresponding to the device type of the second device; and (b) a device model identifier corresponding to the model of the second device. Additionally, the candidate values are associated with a configurable operating parameter that can be correlated with at least one other configurable operating parameter, as shown in fourth row 408 and fifth row 410. The value that AAC logic 180 selects for one of the correlated, configurable operating parameters determines the likely values that AAC logic 180 can select for the other correlated, configurable operating parameters. For example, in one embodiment, the second and third configurable operating parameters (i.e., the operating parameters corresponding to signal propagation frequency and pixel clock frequency) are correlated. AAC logic 180 properly configures the second and third correlated, configurable operating parameters to provide a reduced level of harmonic interference and simultaneously enable an effective operation of the video output component, based on the current operating frequency band and operating channel of WCD 100.

Referring specifically to table 400, first row 402 of table 400 shows that operating parameter "A" is mapped to a set of candidate values "set Aval". Set Aval comprises candidate values "A1" through "An", which includes a default value of "Ax". Operating parameter "A" is not correlated with any other operating parameter. First row 402 also provides the pre-determined level of interference reduction associated with each candidate value of operating parameter "A" via vector [Ea]. In one embodiment, the pre-determined level of interference reduction is a measure of the interference reduction associated with use of a particular candidate value relative to interference associated with a configuration of an operating parameter using the default value as a reference candidate value associated with a corresponding reference harmonic interference level. Second row 404 that is associated with operating parameter "B" is presented in a similar manner to the presentation of parameter "A" in first row 402, and parameter "B" can thus be described in a manner similar to a manner in which parameter A is described.

Third row 406 shows that the operating parameter for drive signal strength is mapped to a set of candidate values "[1 2 3 4 5]". In one embodiment, these five (5) candidate values represent 5 distinct levels of power. The default value is 5. The operating parameter for drive signal strength is not correlated with any other operating parameter. Third row 406 also provides the pre-determined level of interference reduction associated with each candidate value of the operating parameter of drive signal strength via the vector [8 6 4 2 0]. For example, this vector indicates that if the candidate drive signal value of "1" instead of the default drive signal value of 5 is assumed by the operating parameter for drive signal strength, an interference reduction of 8 units is expected within frequency band B1. Continuing with the second element of the vector, "6" units of interference reduction is expected within frequency band B1if candidate drive signal level/value 2 is selected and is compared to a configuration in which the default drive signal value of 5 is selected.

Fourth row 408 shows that the operating parameter for drive signal propagation frequency is mapped to a set of candidate values "[100 101 102 103 104 105 106 107 108 109 110]". In one embodiment, these eleven (11) candidate values represent 11 distinct frequency values. The default frequency value is 106. Fourth row 408 further indicates that the operating parameter for signal propagation frequency is correlated with the operating parameter for pixel clock frequency. In addition, the pre-determined level of interference reduction associated with each of the 11 candidate values of the operating parameter of signal propagation frequency is provided via the vector [2 –3 –2 1 0 2 –1 0 1 3 1]. This vector indicates that if the candidate frequency value of "101" units of frequency is assumed by the operating parameter for signal propagation frequency, an interference reduction of –3 units of interference reduction is expected within frequency band B1. This interference reduction occurs when (a) interference associated with a first configuration in which candidate frequency value 101 is selected as compared to the interference associated with a second configuration in which the default frequency value of 106 is selected, and which default frequency value represents the reference candidate frequency value, and (b) the default value of 420 units of frequency (provided by fifth row 410) is assigned to the operating parameter for pixel clock frequency.

Table 400 presents the harmonic interference reduction performance associated with the 11 candidate propagation frequency values of the operating parameter for signal propagation frequency against only one candidate pixel clock frequency value (e.g., the default pixel clock frequency value of 420) associated with the operating parameter for pixel clock frequency. Theoretically, one hundred and twenty one (121) different combination pairs of values (i.e., 11×11 possible combinations) can be analyzed. However, in one embodiment, AAC logic 180 can eliminate certain combinations based on the analyzed performance results (involving the different combinations) generated while WCD 100 operates within a particular operating frequency band and/or channel. Thus, in a more practical scenario, AAC logic 180 can be pre-programmed to select, from among the 121 possible combinations, one of only 11 candidate combination pair of values provided that enable proper operation of second device 200 and effective harmonic interference reduction within the operating frequency band of WCD 100.

In one embodiment, AAC logic 180 selects a candidate value for at least one of the configurable operating parameters exclusively from among one of (a) the retrieved candidate values from Table 400 or data structure 196 of WCD 100, and (b) the recommended candidate values received from second device 200. In a related embodiment, in which AAC 180 selects the candidate value for a corresponding configurable operating parameter exclusively from among the recommended candidate values, WCD 100 does not have to store/maintain candidate values for the corresponding operating parameter.

In one embodiment, AAC logic 180 selects a candidate value for at least one of the configurable operating parameters by comparing the retrieved, pre-established candidate values with recommended candidate values provided within the configuration data received from second device 200. Thus, for example, WCD 100 or AAC logic 180 dynamically selects a corresponding candidate value for at least one of the drive signal level of the HDMI, the HDMI signal propagation frequency, and the pixel clock frequency from one of (a) pre-selected values that are presented within an entry of a stored data structure and (b) candidate values that match at least one approved value from a range of approved values that are automatically received from the second device when the second device is communicatively coupled to the HDMI.

A designer, programmer, or manufacturer of WCD 100 can pre-determine the stored candidate values and create the data structure 196 in which these values and associated information are stored as firmware or software code. This firmware or software code can be updated and expanded as additional second devices are approved. However, in one embodiment, these stored candidate values are initially derived from at least one of: (a) empirical data and analysis from prior performance measurements and testing, which identify associations described in Table 400; (b) information about the specifications for certain operating parameters for approved second devices; and (c) information about resources and capabilities of WCD 100.

In one embodiment, WCD 100 utilizes its internal clock(s) and capability to generate different frequencies from these clocks to provide a dynamic determination of one or more of the values to apply to the frequency-based operating parameter(s) of a connected second device. For example, WCD 100 receives, from second device 200, configuration data that provides several recommended candidate values for pixel clock frequency, including a first recommended value of 101 MHz. However, WCD 100 is only capable of generating output clock values of 100 MHz (i.e., 200 MHz source clock divided by 2) and 102 MHz (i.e., 408 MHz source clock divided by 4). Although WCD 100 and clock management circuit 155 do not exactly generate a 101 MHz clock, WCD 100 is able to utilize any of these two output clock values as pre-established candidate values in place of the recommended candidate value to configure the corresponding pixel clock operating parameter. Furthermore, WCD 100 has stored information that indicates that the values of the generated output clocks (i.e., 100 MHz and 102 MHz) are within a predetermined range of clock values with which the connected second device can operate. However, these two clocks may provide different impacts on the operating frequency band. Based on empirical data and analysis associated with these clock values, WCD 100 provides corresponding information and/or associations as described in Table 400, including levels of harmonic interference that each of these output clocks cause in various operating frequency bands.

In one embodiment, WCD 100 can generate a universal set of output clocks which provide the complete set of values from which WCD 100 can choose candidate frequency values. WCD 100 can choose candidate frequency values for a particular type of device and/or device model. These values are chosen based on WCD 100 having previously stored information about particular operating parameter specifications for these approved devices. WCD 100 is able to receive a set of recommended candidate values for pixel clock frequency and compare these recommended candidate values with the pre-established candidate values (based on the internal clocks of WCD 100). Based on the comparison between the recommended values and the stored pre-established candidate values, WCD 100 determines a set of matching, candidate values from which a final operating parameter value is selected to configure the corresponding configurable operating parameter. In one embodiment, a first value "matches" a second value when the first value is within a preset threshold range of the second value. In one embodiment, WCD 100 may have additional, stored information that indicates that the first value falls within a broader range of values that the second device recommends for proper operation.

In one implementation, WCD 100 includes (a) candidate propagation frequency values for signals that can be communicated via the HDMI to an approved second device having a same device type as the second device, and (b) candidate pixel clock frequency values that can be applied to a display device of an approved second device having the same display device type as the second device. WCD 100 automatically receives from second device 200 at least one of (a) HDMI signal propagation frequency recommended values supported by the second device and (b) pixel clock frequency values supported by second device 200. In order to configure the operating parameter for propagation or drive signal frequency, and, in response to having received the recommended candidate propagation frequency values, WCD 100 identifies at least one first matching value from the candidate propagation frequency values that match one of the received recommended HDMI signal propagation frequency candidate values. In order to configure the operating parameter for pixel clock frequency, and, in response to having received the recommended candidate pixel clock frequency values, WCD 100 identifies at least one second matching value from the candidate pixel clock frequency values that match one of the received recommended pixel clock frequency candidate values.

In an embodiment, in which the operating parameter for drive signal propagation frequency is correlated with the operating parameter for pixel clock frequency, WCD 100 selects (a) a matching candidate HDMI propagation frequency value from the at least one first matching value for HDMI signal propagation frequency and (b) a matching candidate pixel clock frequency value from the at least one second matching value for pixel clock frequency value. The specific combination of the selected matching, candidate HDMI propagation frequency value and candidate pixel clock frequency value is determined as a combination that minimizes a level of harmonic interference in the operating frequency band of the wireless communication device while the operating parameters are configured with the selected candidate values.

AAC logic 180 automatically configures each of the at least one configurable operating parameter with a corresponding selected candidate value. Following the configuration of the operating parameters, AAC logic 180 initiates a communication from WCD 100 to second device 200 via the first physical communication interface. Based on the configuration of operating parameters with the selected values, AAC logic 180 mitigates at least one of a radiated noise level and a harmonic interference within the current operating frequency receive band of the wireless communication device, while connected second device 200 is operating and is being utilized by WCD 100.

The interference mitigation ability of AAC logic 180 provides designers of second devices, such as docking stations, with flexibility in the placement of a wireless communication device relative to an HDMI converter integrated circuit in the second device. AAC logic 180 selectively and dynamically changes HDMI drive signal strengths, drive signal propagation frequencies, and pixel clock frequencies, according to accessory device types, operating frequency bands and channels in order to prevent HDMI harmonic noise from falling within a pre-determined threshold range of operating frequency receive bands and channels.

Figure 5:
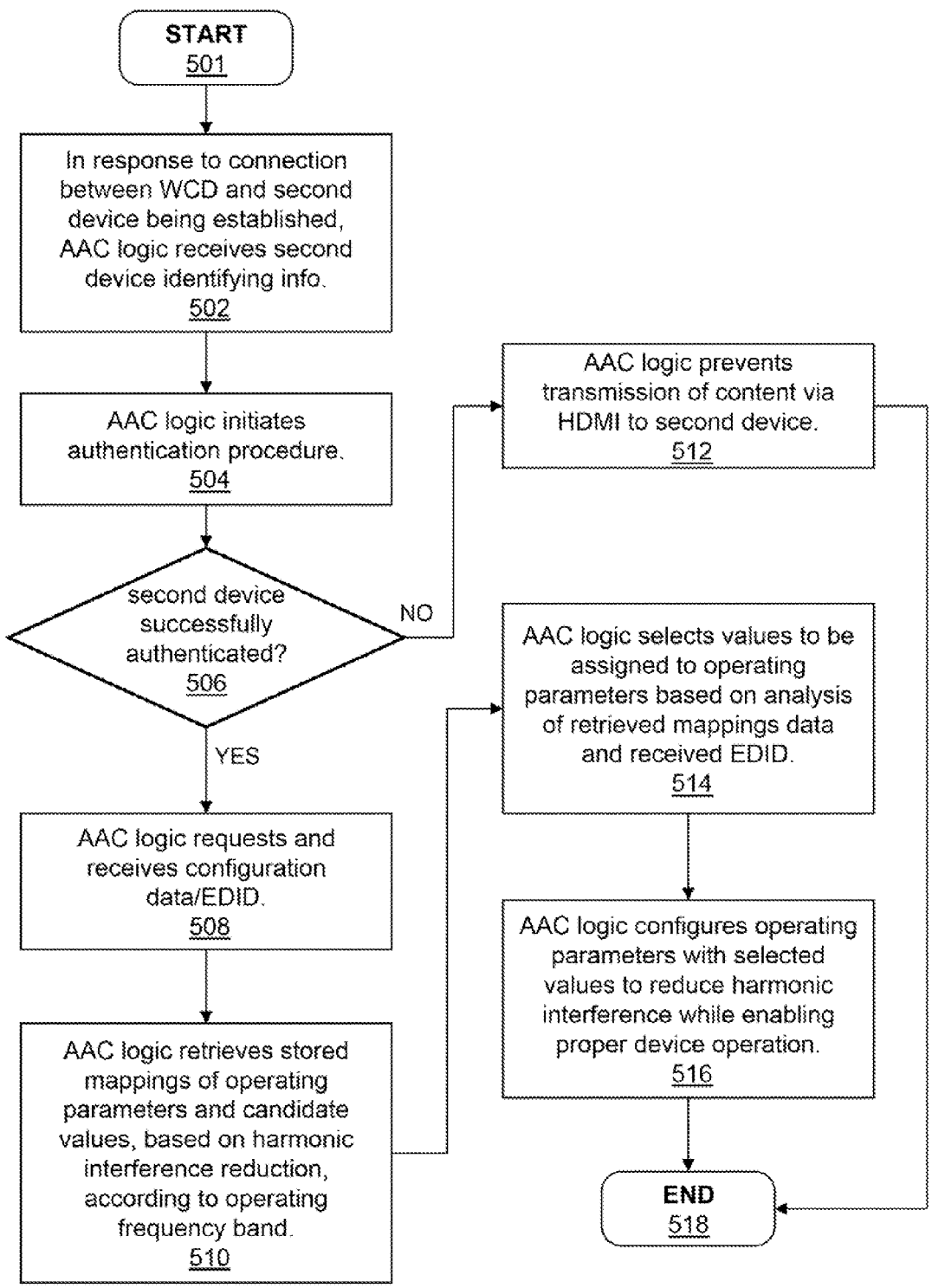
FIG. 5 is a flow chart illustrating the method for configuring operating parameters associated with an operation of a connected accessory/second device in order to mitigate harmonic interference within an operating frequency band of a wireless communication device, according to one embodiment.
Figure 6:
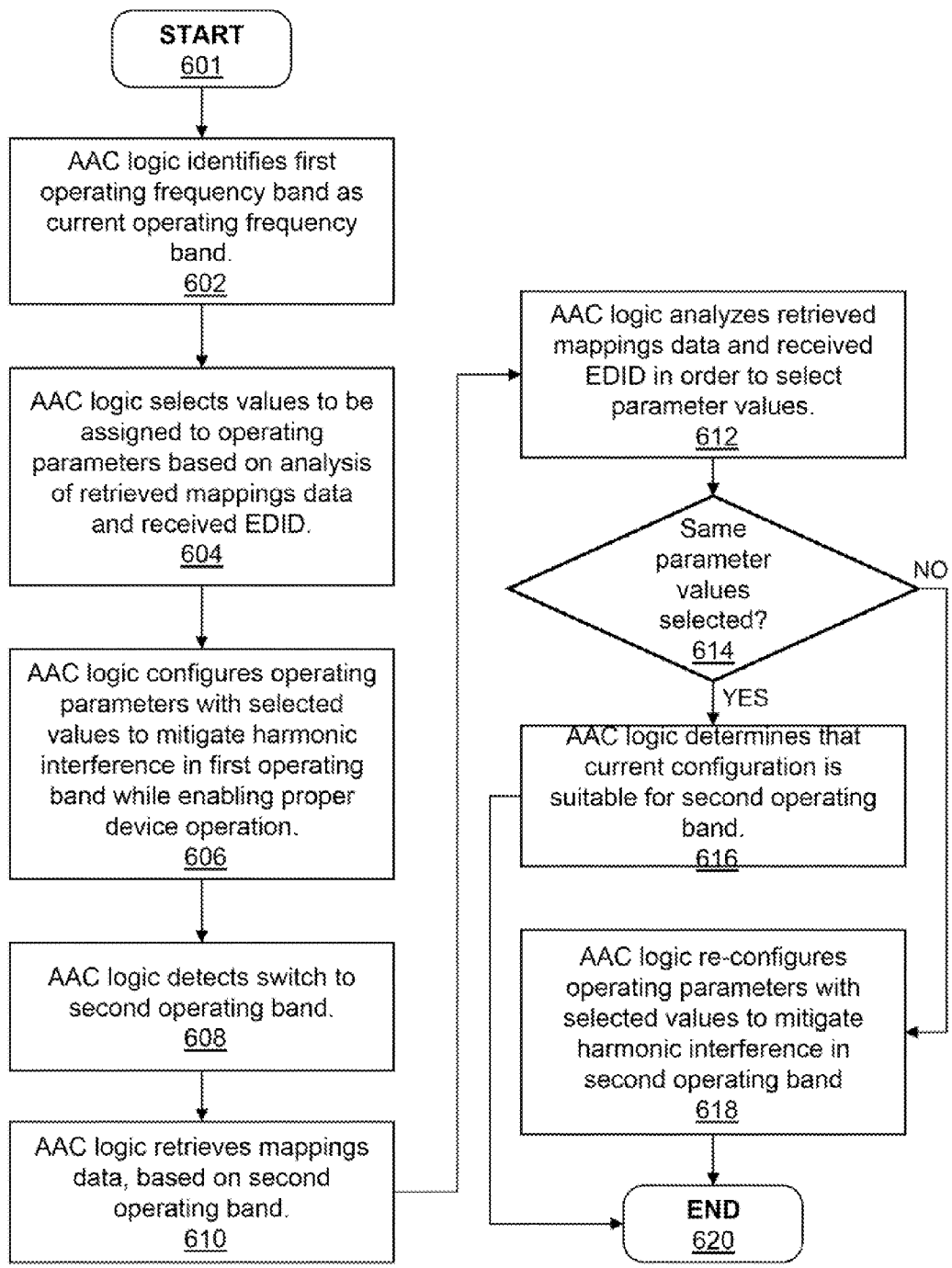
FIG. 6 is a flow chart illustrating the method for updating configured operating parameters associated with an operation of a connected, second device, in response to detecting a switch in the operating frequency band of a wireless communication device, according to one embodiment.
Figure 7:
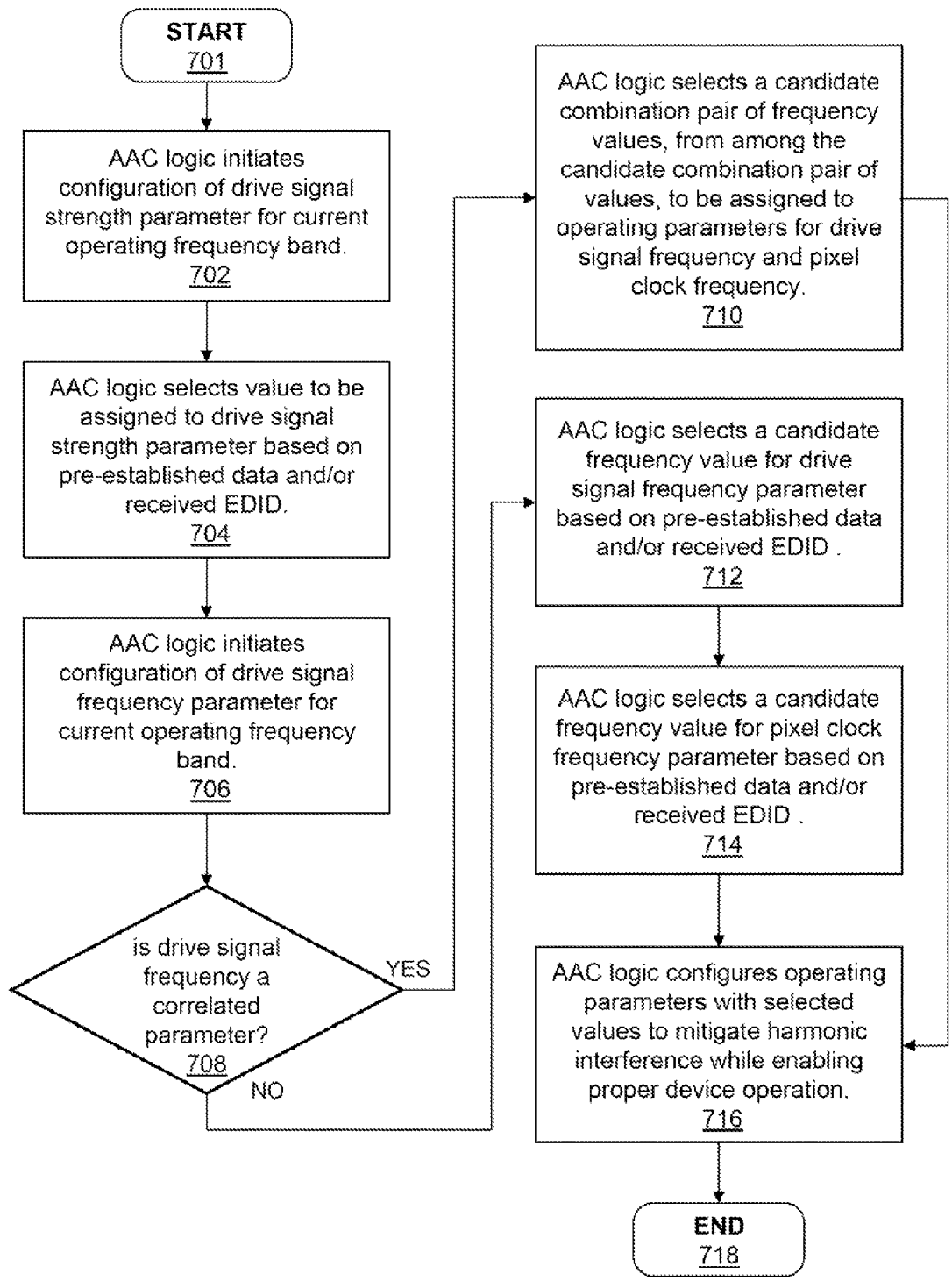
FIG. 7 is a flow chart illustrating the method by which specific operating parameters associated with an operation of a connected second device are configured in order to mitigate harmonic interference within an operating frequency band of a wireless communication device, according to one embodiment.

FIGS. 5-7 are flow charts illustrating methods by which the above processes of the illustrative embodiments can be completed. Although the methods illustrated in FIGS. 5-7 may be described with reference to components and functionality illustrated by and described in reference to FIGS. 1-4, it should be understood that this is merely for convenience and alternative components and/or configurations of the devices and data structures can be employed when implementing the various methods. Certain portions of the methods can be completed by AACU 194 executing on one or more processors 105 within WCD 100 and/or AAC logic 180, such as is generally described in FIG. 1. For simplicity in describing the methods, all method processes are described from the perspective of WCD 100 and/or AAC logic 180; However, certain secondary functions required to support the overall functionality of WCD 100 can be described as being performed by second device 200. These secondary functions involve automatically transmitting device identifying information to WCD 100, in response to detecting that a connection between WCD 100 and the second device is being established via the first and/or second physical communication interface.

FIG. 5 illustrates the method by which operating parameters associated with an operation of a connected second device are configured in order to mitigate harmonic interference within an operating frequency band of a wireless communication device, according to one embodiment. The method begins at initiator block 501 and proceeds to block 502 at which AAC logic 180 receives device identifying information from second device 200, after a connection is established between WCD 100 and second device 200. At block 504, AAC logic 180 initiates an authentication procedure, based on the device identifying information, to determine whether the second device is an approved device for connecting to WCD 100 via the first physical communication interface. At decision block 506, AAC logic 180 determines whether the second device is successfully authenticated. If at decision block 506, AAC logic 180 determines that the second device is successfully authenticated, AAC logic 180 requests and receives configuration data or EDID from second device 200, as shown at block 508. However, if at decision block 506, AAC logic 180 determines that second device 200 is not successfully authenticated, AAC logic 180 prevents transmission of content to second device 200 via the first physical communication interface, as shown at block 512. The method process then ends at block 518. Following a receipt of configuration data at block 508, AAC logic 180 retrieves a data structure having mappings of operating parameters with candidate values, as well as a corresponding level of harmonic interference reduction associated with a specific candidate value, according to a current operating frequency band of WCD 100, as shown at block 510. At block 514, AAC logic 180 selects values to be assigned to the operating parameters based on an analysis of parameter mappings data and the received EDID. At block 516, AAC logic 180 configures the operating parameters with selected values that mitigate harmonic interference while enabling proper device operation. The process ends at block 518.

FIG. 6 illustrates the method by which configured operating parameters associated with an operation of a connected, second device are updated in response to detecting a switch in the operating frequency band of a wireless communication device, according to one embodiment. The method begins at initiator block 601 and proceeds to block 602 at which AAC logic 180 identifies a first operating frequency band as a current operating frequency band of WCD 100. At block 604, AAC logic 180 selects values to be assigned to operating parameters based on the retrieved pre-established parameter data mappings associated with the first operating frequency band and the EDID associated with the first operating frequency band. At block 606, AAC logic 180 configures operating parameters with selected values to mitigate harmonic interference in first operating band while enabling proper device operation.

While WCD 100 is communicatively connected to second device 200 via the HDMI, AAC logic 180 detects a switch by WCD 100 to a second operating frequency band (or to a different operating channel within the first operating frequency band), as shown at block 608. In response to detecting a switch associated with operating frequency, AAC logic 180 autonomously checks a stored data structure of WCD 100 for appropriate candidate values of the operating parameters based on the second, current operating frequency band (and/or current operating frequency channel). As illustrated, at block 610, AAC logic 180 retrieves the pre-established parameter data mappings, according to the second operating frequency band. At block 612, AAC logic 180 analyzes the retrieved pre-established parameter data mappings against the previously received EDID in order to select the operating parameter values. At decision block 614, AAC logic 180 determines whether the same parameter values as selected during a preceding configuration procedure are currently selected. AAC logic 180 dynamically and selectively changes each operating parameter based on differences in a previous set and a current, appropriate set of candidate values associated with at least one of the first operating frequency band being changed to the second, current operating frequency band and the first operating frequency channel being changed to the second, current operating frequency channel. If at decision block 614 AAC logic 180 determines that the same parameter values as selected during the preceding configuration procedure are currently selected, AAC logic determines that the current configuration is suitable for the second frequency operating band or channel, as shown at block 616. However, if at decision block 614 AAC logic 180 determines that the currently selected parameter values are different from the parameter values for the preceding configuration process, AAC logic 180 re-configures the operating parameters with the currently selected values to mitigate harmonic interference while WCD 100 operates in the second operating band, as shown at block 618. The process ends at block 620.

FIG. 7 illustrates the method by which specific operating parameters associated with an operation of a connected second device are configured in order to mitigate harmonic interference within an operating frequency band of a wireless communication device, according to one embodiment. Specifically, with the method of FIG. 7, the operating parameters are assumed to be drive signal strength and drive signal frequency for an HDMI, as well as pixel clock frequency for a display device of the connected second device 200. The method begins at initiator block 701 and proceeds to block 702 at which AAC logic 180 initiates a configuration of the operating parameter for drive signal strength for the current operating frequency band. At block 704, AAC logic 180 selects a candidate value to be assigned to the operating parameter for drive signal strength based on the pre-established parameter data and/or an EDID received from second device 200. At block 706, AAC logic 180 initiates a configuration of the operating parameter for drive signal frequency for the current operating frequency band. At decision block 708, AAC logic 180 determines whether the operating parameter for drive signal frequency is correlated with the operating parameter for pixel clock frequency. If at decision block 708, AAC logic 180 determines that the operating parameter for drive signal frequency is correlated with the operating parameter for pixel clock frequency, AAC logic 180 selects a candidate combination pair of frequency values as shown at block 710. These values are selected from among the pre-established candidate combination pair of values, to be assigned to operating parameters for drive signal frequency and pixel clock frequency. The candidate combination pair comprises a propagation frequency or drive signal frequency value and a pixel clock frequency value. Following selection of parameter values at block 710, the operating parameters are configured with the selected values, as shown at block 716.

However, if at decision block 708 AAC logic 180 determines that the operating parameter for drive signal frequency is not correlated with the operating parameter for pixel clock frequency, AAC logic 180 selects a candidate frequency value for the operating parameter for drive signal frequency based on the pre-established parameter data and/or the received EDID, as shown at block 712. At block 714, AAC logic 180 selects a candidate frequency value for the operating parameter for pixel clock frequency based on the pre-established parameter data and/or the received EDID. At block 716, AAC logic 180 configures the three operating parameters with the corresponding selected values that collectively mitigate harmonic interference while enabling proper operation of the second device. The process ends at block 718.

The flowchart, message flow diagram and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

In some implementations, certain processes of the methods are combined, performed simultaneously or in a different order, or perhaps omitted, without deviating from the spirit and scope of the invention. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. In a wireless communication device having a processor and at least one physical communication interface for communicatively connecting to a second device, a method comprising:
receiving device identifying information about the second device to which the wireless communication device is connected via a first physical communication interface;
determining, for each of at least one configurable operating parameter associated with an operation of the connected second device, a set of candidate values that are mapped to a corresponding configurable operating parameter, based on the received device identifying information;
in response to determining the set of candidate values, the processor dynamically selecting a candidate value, from among the set of candidate values, for configuring the corresponding configurable operating parameter, based on at least one of (a) a current operating frequency band of the wireless communication device; (b) a current operating channel of the wireless communication device; and (c) a level of harmonic interference expected within the current operating frequency band of the wireless communication device; and
automatically configuring each of the at least one configurable operating parameter with a corresponding selected candidate value;
wherein said automatically configuring with the corresponding selected candidate value results in a mitigation of at least one of a radiated noise level and a harmonic interference within the current operating frequency band of the wireless communication device.

2. The method of claim 1, wherein the first physical communication interface is a high definition multimedia interface (HDMI) and the second device is a HMDI enabled device having a HDMI connecting port for connecting with the HDMI of the wireless communication device.

3. The method of claim 2, wherein:
the HDMI is associated with a first configurable operating parameter for a drive signal level for signals communicated over the HDMI to the second device, wherein said first configurable operating parameter for the drive signal level has a pre-established default value for the drive signal level;
the at least one configurable parameter comprises the first configurable operating parameter for the drive signal level; and
the automatically configuring comprises selecting a lower value for the drive signal level from a corresponding, first set of candidate values for the drive signal level, wherein the pre-established default value for the drive signal level is a higher value than the selected lower value, and wherein said lower value is selected instead of the pre-established default value to provide a reduced overall noise level within the current operating frequency band of the wireless communication device.

4. The method of claim 3, wherein dynamically selecting comprises:
retrieving the corresponding, first set of candidate values from a stored data structure within the wireless communication device; and
selecting, from the first set of candidate values comprising multiple selectable pre-established values, the lower value for the drive signal level, wherein said multiple selectable pre-established values range from a minimum value to a maximum value that corresponds to the default value of the drive signal level;
wherein each of the multiple selectable pre-established values are associated in the stored data structure with at least one of (a) a specific device type identifier corresponding to the device type of the second device, (b) a device model identifier corresponding to the model of the second device, (c) a particular channel within the current operating frequency band, and (d) the first configurable operating parameter for a drive signal level, which is correlated with at least one other configurable operating parameter.

5. The method of claim 4, further comprising:
in response to the second device having a video output component that operates utilizing at least one of a second configurable operating parameter for HDMI signal propagation frequency and a third configurable operating parameter for pixel clock frequency, retrieving the corresponding first set of candidate values further comprises selecting a first candidate value of the drive signal level based on at least one of (a) a second candidate value that is selected for configuring the second configurable operating parameter for HDMI signal propagation frequency of the video output component and (b) a third candidate value selected for configuring the third configurable operating parameter for pixel clock frequency;
wherein the selected first, second, and third candidate values are correlated to provide configured operating parameters of the HDMI and the second device that collectively provide a reduced level of harmonic interference and simultaneously enable an effective operation of the video output component, based on the current operating frequency band and operating channel of the wireless communication device.

6. The method of claim 2, wherein:
the set of candidate values for each of the at least one configurable operating parameter comprises at least one of: a first set of candidate values for the drive signal level; a second set of candidate values for an HDMI signal propagation frequency; and a third set of candidate values for a pixel clock frequency of a video component of the second device; and
the dynamically selecting comprises dynamically selecting a corresponding candidate value for at least one of the drive signal level of the HDMI, the HDMI signal propagation frequency, and the pixel clock frequency from one of (a) pre-selected values that are presented within an entry of a stored data structure and (b) candidate values that match at least one approved value from a range of approved values that are automatically received from the second device when the second device is communicatively coupled to the HDMI.

7. The method of claim 2, wherein:
the second device is an accessory having an HDMI receptor to which the HDMI is connected, and the wireless communication device is a mobile phone that communicates with the accessory via the HDMI following a successful authentication of the accessory as an approved accessory for communicating via the HDMI; and wherein the wireless communication device receives an extended display information data (EDID) from the second device following successful authentication, wherein said EDID comprises a plurality of specifications for a display component of the second device including at least one of: (a) a set of values for each configurable operating parameter; and (b) a set of default values for each configurable operating parameter.

8. The method of claim 2, wherein:

the dynamically selecting comprises selecting from a data structure that includes a table of operating parameter values that is stored within the wireless communication device and that comprises a plurality of mappings associating (a) device identifying information for various device types and models of approved second devices with (b) a corresponding set of candidate values mapped to each of the at least one configurable operating parameter associated with an operation of the HDMI and the identified second device type and model;

wherein the set of candidate values for each of the at least one configurable operating parameter comprises at least one of (a) a first set of candidate values for a corresponding configurable operating parameter for the drive signal level of signals communicated over the HDMI and (b) a second set of candidate values for a corresponding configurable operating parameter for a delivery of content to the second device via the communicated signals and (c) a third set of candidate values for a corresponding configurable operating parameter for other operations of the second device.

9. The method of claim 2, further comprising:

detecting when the wireless communication device switches at least one of (a) a first operating frequency band to a second, current operating frequency band and (b) a first operating frequency channel to a second, current operating frequency channel, while the wireless communicating device is communicatively connected to the second device via the HDMI; and in response to detecting a switch associated with operating frequency, autonomously checking a stored data structure of the wireless communication device for appropriate candidate values of the operating parameters based on the second, current operating frequency band and second, current operating frequency channel, and dynamically and selectively changing each operating parameter based on differences in a previous set and a current, appropriate set of candidate values associated with at least one of the first operating frequency band being changed to the second, current operating frequency band and the first operating frequency channel being changed to the second, current operating frequency channel.

10. The method of claim 1, further comprising:

receiving authentication data from the second device prior to performing the dynamically selecting and the automatically configuring functions;

determining, by comparing the authentication data with at least one authentication parameter stored within the wireless communication device, whether the second device is an approved device for connecting to the communication device via the first physical communication interface;

in response to determining that the second device is an approved device, performing the dynamically selecting and automatically configuring functions and initiating a communication from the wireless communication device to the second device via the first physical communication interface; and in response to determining that the second device is a not an approved device, preventing the second device from communicating with the wireless communication device via the first physical communication interface;

wherein the receiving of the authentication data from the second device is performed via one of a wireless communication with the wireless communication device and a wired communication over a different physical communication interface.

11. The method of claim 10, wherein:

the set of candidate values for each of the at least one configurable operating parameter includes at least one of candidate propagation frequency values for signals that can be communicated via the HDMI to an approved second device having a same device type as the second device, and candidate pixel clock frequency values that can be applied to a display device of an approved second device having the same device type as the second device; and the method further comprises:

automatically receiving from the second device at least one of (a) HDMI signal propagation frequency values supported by the second device and (b) pixel clock frequency values supported by the second device;

in response to the at least one set of candidate values comprising the candidate propagation frequency values, the dynamically selecting further comprises identifying at least one first matching value from the candidate propagation frequency values that match one of the received HDMI signal propagation frequency values; and in response to the at least one set of candidate values comprising the candidate pixel clock frequency values, the dynamically selecting further comprises identifying at least one second matching value from the candidate pixel clock frequency values that match one of the received pixel clock frequency values; and selecting (a) a matching candidate HDMI propagation frequency value from the at least one first matching value for HDMI signal propagation frequency and (b) a matching candidate pixel clock frequency value from the at least one second matching value for pixel clock frequency, wherein a combination of the selected matching, candidate HDMI propagation frequency value and pixel clock frequency value is predetermined as a combination that minimizes a level of harmonic interference in the operating frequency band of the wireless communication device while the operating parameters are configured with the selected candidate values.

12. A wireless communication device comprising:

a processor;

a wireless receiver that operates in at least one frequency band having at least one frequency channel;

a first physical communication interface coupled to the processor that enables connection of the wireless communication device to a corresponding device interface mechanism of a second device;

a storage accessible to the processor and having stored thereon at least one data structure that provides at least one mapping of (a) device identifying information for various device types and models of approved second devices with (b) a corresponding set of candidate values mapped to each of the at least one configurable operating parameter associated with an operation of the HDMI and the identified second device type and model, wherein the set of candidate values for each of the at least one configurable operating parameter comprises at least one of (a) a first set of candidate values for a corresponding configurable operating parameter for the drive signal level of signals communicated over the HDMI, (b) a second set of candidate values for a corresponding configurable operating parameter for a delivery of content to the second device via the communicated signals, and (c) a third set of candidate values for a corresponding configurable operating parameter for other operations of the second device;

configuration logic associated with the processor that in response to a connection of the wireless communication device to the second device via the first physical communication interface:

receives device identifying information about the second device to which the wireless communication device is connected via a first physical communication interface;

determines, for each of at least one configurable operating parameter associated with an operation of the connected second device, a set of candidate values that are mapped to a corresponding configurable operating parameter, based on the received device identifying information;

in response to determining the set of candidate values, the processor dynamically selects a candidate value, from among the set of candidate values, for configuring the corresponding configurable operating parameter, based on at least one of (a) a current operating frequency band of the wireless communication device; (b) a current operating channel of the wireless communication device; (c) a level of harmonic interference expected within the current operating frequency band of the wireless communication device; and configuration logic associated with the first physical communication interface that automatically configures each of the at least one configurable operating parameter with a corresponding selected candidate value, wherein said automatically configuring with the corresponding selected candidate value results in a mitigation of at least one of a radiated noise level and a harmonic interference within the current operating frequency band of the wireless communication device.

13. The wireless communication device of claim 12, wherein the first physical communication interface mechanism is a high definition multimedia interface (HDMI) and the second device is a HMDI enabled device having a HDMI connecting port for connecting with the HDMI of the wireless communication device.

14. The wireless communication device of claim 13, wherein:

the HDMI is associated with a first configurable operating parameter for a drive signal level for signals communicated over the HDMI to the second device, wherein said first configurable operating parameter for the drive signal level has a pre-established default value for the drive signal level;

the at least one configurable parameter comprises the first configurable operating parameter for the drive signal level; and the configuration logic automatically configures by selecting a lower value for the drive signal level from a corresponding, first set of candidate values for the drive signal level, wherein the pre-established default value for the drive signal level is a higher value than the selected lower value, and wherein said lower value is selected instead of the pre-established default value to provide a reduced overall noise level within the current operating frequency band of the wireless communication device.

15. The wireless communication device of claim 14, wherein the configuration logic that dynamically selects further comprises configuration logic to:

retrieve the corresponding, first set of candidate values from a stored data structure within the wireless communication device; and select, from the first set of candidate values comprising multiple selectable pre-established values, the lower value for the drive signal level, wherein said multiple selectable pre-established values range from a minimum value to a maximum value that corresponds to the default value of the drive signal level;

wherein each of the multiple selectable pre-established values are associated in the stored data structure with at least one of (a) a specific device type identifier corresponding to the device type of the second device, (b) a device model identifier corresponding to the model of the second device, and (c) a particular channel within the current operating frequency band, and (d) the first configurable operating parameter for a drive signal level, which is correlated with at least one other configurable operating parameter.

16. The method of claim 15, further comprising configuration logic that:

in response to the second device having a video output component that operates utilizing at least one of a second configurable operating parameter for HDMI signal propagation frequency and a third configurable operating parameter for pixel clock frequency, retrieves the corresponding first set of candidate values further comprises selecting a first candidate value of the drive signal level based on at least one of (a) a second candidate value that is selected for configuring the second configurable operating parameter for HDMI signal propagation frequency of the video output component and (b) a third candidate value selected for configuring the third configurable operating parameter for pixel clock frequency;

wherein the selected first, second, and third candidate values are correlated to provide configured operating parameters of the HDMI and the second device that collectively provide a reduced level of harmonic interference and simultaneously enable an effective operation of the video output component, based on the current operating frequency band and operating channel of the wireless communication device.

17. The wireless communication device of claim 13, wherein:

the set of candidate values for each of the at least one configurable operating parameter comprises at least one of: a first set of candidate values for the drive signal level; a second set of candidate values for an HDMI signal propagation frequency; and a third set of candidate values for a pixel clock frequency of a video component of the second device;

the configuration logic dynamically selects at a corresponding candidate value for at least one of the drive signal level of the HDMI, the HDMI signal propagation frequency, and the pixel clock frequency from one of (a) pre-selected values that are presented within an entry of a stored data structure and (b) candidate values that match at least one approved value from a range of approved values that are automatically received from the second device when the second device is communicatively coupled to the HDMI; and the set of candidate values for each of the at least one configurable operating parameter includes at least one of candidate propagation frequency values for signals that can be communicated via the HDMI to an approved second device having a same device type as the second device, and candidate pixel clock frequency values that can be applied to a display device of an approved second device having the same device type as the second device; and the configuration logic further comprises logic to:
automatically receive from the second device at least one of (a) HDMI signal propagation frequency values supported by the second device and (b) pixel clock frequency values supported by the second device;
in response to the at least one set of candidate values comprising the candidate propagation frequency values, the configuration logic that dynamically selects further comprises logic to identify at least one first matching value from the candidate propagation frequency values that match one of the received HDMI signal propagation frequency values; and
in response to the at least one set of candidate values comprising the candidate pixel clock frequency values, the configuration logic that dynamically selects further comprises logic to identify at least one second matching value from the candidate pixel clock frequency values that match one of the received pixel clock frequency values; and
select (a) a matching candidate HDMI propagation frequency value from the at least one first matching value for HDMI signal propagation frequency and (b) a matching candidate pixel clock frequency value from the at least one second matching value for pixel clock frequency, wherein a combination of the selected matching, candidate HDMI propagation frequency value and pixel clock frequency value is pre-determined as a combination that minimizes a level of harmonic interference in the operating frequency band of the wireless communication device while the operating parameters are configured with the selected candidate values.

18. The wireless communication device of claim 13, the configuration logic further comprising logic that:
detects when the wireless communication device switches at least one of (a) a first operating frequency band to a second, current operating frequency band and (b) a first operating frequency channel to a second, current operating frequency channel, while the wireless communicating device is communicatively connected to the second device via the HDMI; and
in response to detecting a switch associated with operating frequency, autonomously checks a stored data structure of the wireless communication device for appropriate candidate values of the operating parameters based on the second, current operating frequency band and second, current operating frequency channel, and dynamically and selectively changing each operating parameter based on differences in a previous set and a current, appropriate set of candidate values associated with at least one of the first operating frequency band being changed to the second, current operating frequency band and the first operating frequency channel being changed to the second, current operating frequency channel.

19. The wireless communication device of claim 13, wherein the second device is an accessory having an HDMI receptor to which the HDMI is connected, and the wireless communication device is a mobile phone that communicates with the accessory via the HDMI following a successful authentication of the accessory as an approved accessory for communicating via the HDMI; and wherein the wireless communication device receives an extended display information data (EDID) from the second device following successful authentication, wherein said EDID comprises a plurality of specifications for a display component of the second device including at least one of: (a) a set of values for each configurable operating parameter; and (b) a set of default values for each configurable operating parameter.

20. The wireless communication device of claim 12, further comprising configuration logic that:
receives authentication data from the second device prior to performing the dynamically selecting and the automatically configuring functions;
determines, by comparing the authentication data with at least one authentication parameter stored within the wireless communication device, whether the second device is an approved device for connecting to the communication device via the first physical communication interface;
in response to determining that the second device is an approved device, performs the dynamically selecting and automatically configuring functions and initiates a communication from the wireless communication device to the second device via the first physical communication interface; and
in response to determining that the second device is a not an approved device, prevents the second device from communicating with the wireless communication device via the first physical communication interface;
wherein the receipt of the authentication data from the second device is performed via one of a wireless communication with the wireless communication device and a wired communication over a different physical communication interface.

* * * * *